United States Patent [19]

Kahoyashi et al.

[11] Patent Number: 5,041,850

[45] Date of Patent: Aug. 20, 1991

[54] CONTROLLER OF A LABEL PRINTER

[75] Inventors: Hitoshi Kahoyashi; Naohara Marusawa; Masao Ando; Isutomu Maruyama; Kazuhiko Kobayashi; Yuichi Nakazawa, all of Nagano; Yoichiro Saito, Tokyo; Masaki Hirano, Nagano, all of Japan

[73] Assignees: Nisshinbo Industries, Inc., Tokyo; Nagano Japan Radio Co., Ltd., Nagano, both of Japan

[21] Appl. No.: 516,535

[22] Filed: Apr. 30, 1990

[30] Foreign Application Priority Data

May 9, 1989 [JP] Japan .................................. 1-114135
May 11, 1989 [JP] Japan .................................. 1-116074

[51] Int. Cl.[5] ...................... G01D 15/06; G03G 21/00
[52] U.S. Cl. .................................. 346/153.1; 355/202
[58] Field of Search ...................... 346/153.1; 355/202

[56] References Cited

U.S. PATENT DOCUMENTS 4,347,525 8/1982 Moore et al. .................... 346/153.1
4,734,721 3/1988 Boyer et al. ........................ 346/159
4,862,194 8/1989 Uematsu ........................ 346/76 PH

*Primary Examiner*—George H. Miller, Jr.

[57] ABSTRACT

A controller of a label printer employs an electronic photographic system which makes printing successively on a continuous printing paper on which a multiplicity of label papers are affixed. There are provided a position sensor using a photoelectric transducer element which is disposed to face the continuous printing paper and detect a difference in the transmissivity of light of the continuous printing paper and a label position detector for processing a detection signal of the position sensor to derive a timing control signal corresponding to a position of the label paper. The timing control signal of the label position detector is used to control operation timings for each of the portions for the continuous printing paper. The label position detector includes an amplifier for amplifying the detection signal of the position sensor and a comparator for comparing the detection signal with a reference signal, and particularly includes a variable setting function for a gain of the amplifier and a magnitude of the reference signal to automatically set so that a relative detection output for the label paper is increased.

15 Claims, 8 Drawing Sheets

CONTROLLER OF A LABEL PRINTER

BACKGROUND OF THE INVENTION

1. Field of the Invention

The present invention relates to a controller of a label printer using an electronic photographic system which makes printing on a continuous printing paper on which a multiplicity of label papers are successively affixed.

2. Description of the Relevant Art

A label printer is known which can print successively on a continuous printing paper on which a multiplicity of label papers are successively affixed.

In this type of label printer, in order to make printing on predetermined positions of the label paper arranged lengthwise of the continuous printing paper at regular intervals, it is very important to exactly control operation timings for various portions, for example, an operation start timing of a printing mechanism for the label paper, a cut timing of a cutter mechanism and the like.

Heretofore, as means for controlling the operation timing, there is known an apparatus disclosed in Japanese Patent Application Laid-Open No. 53-8138 in which feeding holes are formed in both sides of the continuous printing paper lengthwise thereof at regular intervals and pins or teeth of a sprocket are engaged with the feeding holes to move the printing paper so that a rotary angle of the sprocket is controlled to control the position of the continuous printing paper. Alternatively, there is known an apparatus in which the feeding holes of the continuous printing paper are detected by an optical sensor to detect the position thereof.

In the above conventional timing control method, however, it is necessary to use the continuous printing paper in which holes are formed and further there is a limit in the accuracy of the detection of the position.

In the continuous printing paper on which a multiplicity of label papers are successively affixed, an optical sensor can be directly utilized to detect the position of the label paper. More particularly, there is a difference in thickness between an unaffixed paper portion of the printing paper on which the label paper is not affixed and an affixed paper portion of the printing paper on which the label paper is affixed and accordingly a difference in the transmissivity of light can be detected by an optical sensor. However, on the contrary, since the difference of the transmissivity is detected, if there is variation in the thickness of the continuous printing paper and the label paper or the difference in the transmissivity is not so large or further kinds of printing paper and label paper are different, the detection of the difference is impossible or remarkably unstable.

SUMMARY OF THE INVENTION

It is an object of the present invention to provide a controller of a label printer which can detect the position of a label paper exactly to thereby control an operation start timing of a printing mechanism and a cut timing of a cutter mechanism with high accuracy without provision of feeding holes in a continuous printing paper on which a multiplicity of label papers are successively affixed.

Further, it is another object of the present invention to provide a controller of a label printer which can control operation timings of various portions exactly and can be applied to the printing of labels of many varieties and in small quantities without the influence of thickness of the printing paper and the label paper, a distance in the feeding direction of the printing paper and material of the printing paper and the label paper.

In addition, it is a further object of the present invention to provide a controller of a label printer in which a roller of a roller mechanism is utilized to effect the skew correction easily so that exact position detection and printing control for the label paper can be performed and paper jam can be easily detected by rotation of the roller of the roller mechanism.

In order to achieve the above objects, the controller of the label printer according to the present invention comprises a main charger 3 for charging a photosensitive drum 2, a printing head 4 for applying printing information, a developer 5 for attaching toner, a transfer charger 6 for transferring the toner on the photosensitive drum 2 to label papers S affixed on a continuous paper R constituting a continuous printing paper P, and a fixing device 7 for fixing the toner by causing the continuous printing paper P to pass through the fixing device 7. The controller 1 of the label printer which is capable of printing successively on the label papers S comprises position sensors 10 and 11 each using a photoelectric transducer element which is disposed to face the continuous printing paper P. The position sensors 10 and 11 detect a difference in the transmissivity of light of the continuous printing paper P and label position detectors 12_a_ and 12_b_ which process detection signals of the position sensors 10 and 11 to derive timing control signals Do and Dp corresponding to the positions of the label paper S. Thus, the operation timings of various portions for the continuous printing paper P, for example, the operation start timing of the printing head 4 of a printing mechanism U1 and the transfer charger 6 or the cut timing of a cutter mechanism U2 are controlled in accordance with the timing control signals Do and Dp of the label position detectors 12_a_ and 12_b_. In this case, the label position detector 12_a_ (12_b_) comprises an amplifier 13_a_ which amplifies the detection signal of the position sensor 10 (11) and a comparator 13_b_ which compares the detection signal with a reference signal. Further, there is provided variable setting function for setting a gain of the amplifier 13_a_ and a magnitude of the reference signal variably and which automatically and variably sets to increase a relative detection output of the label paper S with respect to the continuous paper R. Thus, the label paper S is exactly distinguished from the continuous paper R. One position sensor 10 is disposed at a position or at the side near a supply reel in a moving path N of the continuous printing paper P in accordance with the position of the printing head 4. Further, there is provided a timer which sets a printing position for the label paper S after the label paper S has been detected by the position sensor 10. Preferably, there are provided a plurality of timers 14_a_ to 14_e_ which are disposed in accordance with each of label papers S and can set printing positions for other label papers S until printing of a label paper S is completed after the label paper S has been detected. Further, the other position sensor 11 is disposed behind the fixing device 7. In this case, a timer is provided which sets a cutting position for the label paper S after the label paper S has been detected by the position sensor 11 after the printing. Preferably, a plurality of timers 15_a_ to 15_c_ are provided which are disposed in accordance with each of the label papers S and can set the cutting positions for other label papers S until cutting of a label paper S is completed after the label paper S has been detected.

Thus, the printing positions and the cutting positions are set.

On the other hand, a paper width sensor 16 is provided for detecting a position in the direction of width of the continuous printing paper P. A roller inclination actuator 18 may incline a roller mechanism 17 including a drive roller 17*a* and a driven roller 17*b* for moving the continuous printing paper P to the forward and backward direction in the moving direction of the continuous printing paper P. A skew correction mechanism U3 drives the actuator 18 on the basis of positional deviation in respect to a normal position detected by the paper width sensor 16 and variably controls the inclination angle of the roller mechanism 17 in the direction of reducing deviation in the position of the continuous printing paper P. The roller mechanism 17 can use a heat roller 20 and 21 of the fixing device 7. Thus, the skew is successively corrected to detect a more exact label position.

Further, the driven roller 17*b* is provided with a rotation sensor 22 for detecting rotation. A detection mechanism U4 detects a paper jam in accordance with a detected result of the rotation sensor 22. When the driven roller 17*b* is stopped, the rotation sensor 22 detects the stop of the driven roller 17*b* to produce an output. The duration of the output is counted and when the counted time exceeds a predetermined time, it is detected as a paper jam. Thus, the printing state of the continuous printing paper P is monitored.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is now described with reference to the drawings.

Figure 12:
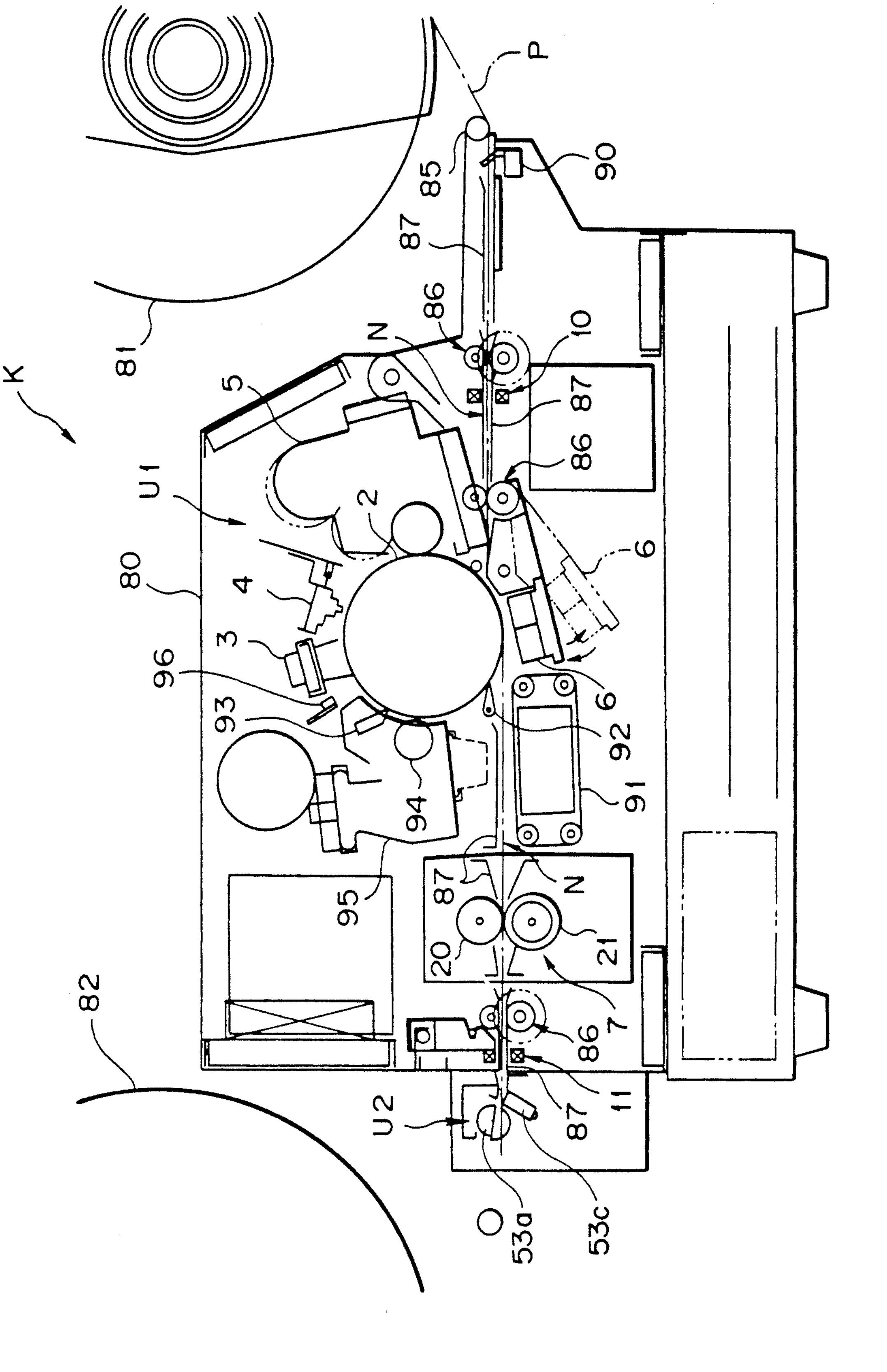
FIG. 12 is a front view schematically illustrating a label printer.

For the clarification of the present invention, referring to FIG. 12, the whole configuration of a label printer K using an electronic photographic system is described.

In FIG. 12, a machine body 80 is provided with a supply reel 81 and a cutter mechanism U2 (a take-up reel 82) mounted to reel shafts disposed at front and rear ends (in the right and left sides in FIG. 12) of the machine body 80. One of the cutter mechanism U2 and the take-up reel 82 can be selectively provided.

A photosensitive drum 2 is disposed in the middle of the machine body 80. A continuous printing paper P is fed from the supply reel 81 into the machine body 80 and further fed to the cutter mechanism U2 through a traveling path N consisting of a guide post 85 disposed at the rear end of the machine body 80. A plurality of pairs of roller mechanisms 86 are provided and include a pair of a drive roller and a driven roller disposed lengthwise of the machine body 80. A plurality of guide plates 87 are disposed to hold the continuous printing paper P between the roller mechanisms 86 and the like.

The continuous printing paper P is brought into contact with or is separated from a lower peripheral surface of the photosensitive drum 2 in the machine body 80. A transfer charger 6 is disposed opposite to the lower peripheral surface of the photosensitive drum 2 in the traveling path N so that the continuous printing paper P is held between the lower peripheral surface of the photosensitive drum 2 and the transfer charger 6, and the transfer charger 6 is displaced between positions shown by the solid line and broken line in FIG. 12 so that the continuous printing paper P is brought into contact with or is separated from the lower peripheral surface of the photosensitive drum 2.

Disposed near the entrance of the traveling path N between the supply reel and the photosensitive drum 2 is a paper sensor 90 for detecting the presence of the printing paper P and a position sensor 10 for detecting the position of the label papers S affixed on the printing paper P.

Further, disposed in the traveling path N positioned between the photosensitive drum 2 and the cutter mechanism U2 is a conveyor-type suction device 91 utilizing a belt which sucks the printing paper P downward by a negative pressure so as to stably take out the printing paper P without bringing the printing paper P fed out from the lower peripheral surface of the photosensitive drum 2 into contact with the drum 2. In addition, a fixing device 7 is provided for fixing the toner attached on the printing paper P passed through the suction device 91 by means of a pair of heat rollers 20 and 21, and a position sensor 11 which is disposed before the cutter mechanism U2 to detect the cut position for the continuous printing paper P.

On the other hand, a main mechanism of a printing mechanism U1 is disposed about the photosensitive drum 2. A main charger 3 is provided for charging the photosensitive drum 2, a printing head 4 prints information such as figures and characters on the photosensitive drum 2 and a developer 5 attaches toner to the printing information on the photosensitive drum 2. All of these elements are successively disposed opposite to the surface of the photosensitive drum 2 before the transfer.

A peeling-off nail 92 peels off the continuous printing paper P from the photosensitive drum 2. A cleaner (toner collector) 95 is provided which includes a blade 93 and a magnetic roller 94. An eraser 96 is provided for erasing charges on the photosensitive drum 2.

The configuration of a main portion of a controller 1 according to the present invention is now described with reference to FIGS. 1 and 2.

Figure 1:
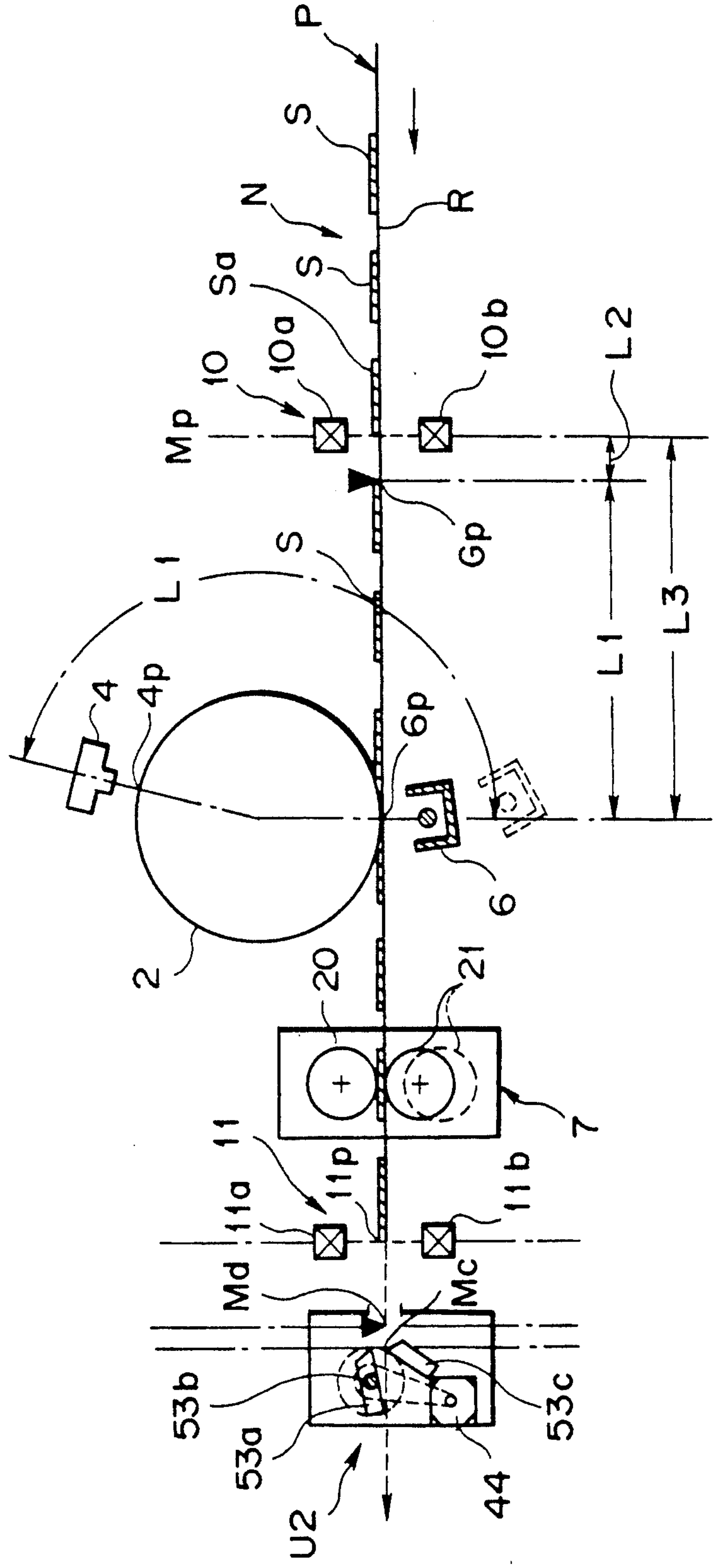
FIG. 1 is a sectional view showing a configuration of a main portion in a controller of a label printer according to the present invention.

As shown in FIG. 1, sensors 10 and 11 are provided for detecting the printing position and the cut position. The position sensors 10 and 11 utilize optical sensors using photoelectric transducers and include light receiving portion 10*a* and 11*a* disposed above the traveling path N and light emitting portions 10*b* and 11*b* disposed under the traveling path N in opposing relationship with the traveling path N. There is a difference in the thickness of paper between the continuous paper R constituting the continuous printing paper S and on which the label paper S is not affixed and the continuous printing paper S on which the label papers S are affixed and there is a difference in the light transmissivity between the paper R and the paper S. Accordingly, the position sensors 10 and 11 can distinguish the continuous printing paper S on which the label papers S are affixed from the continuous paper R on which the label paper S is not affixed.

There is a case where the thickness and material of the continuous paper R and the label paper S constituting the continuous printing paper P may be different and accordingly a difference in the light transmissivity between the papers R and S may not be so large. For example, in the case where the continuous paper R is relatively thick while the label paper S is relatively thin or the case where both of the continuous paper R and the label paper S are relatively thick, the difference in the light transmissivity is small. In this manner, when the difference in the light transmissivity between the continuous paper R without the label paper S and the printing paper P on which the label paper S is affixed is not so large, the label paper S can not be clearly distinguished from the continuous paper R only by means of the outputs of the position sensors 10 and 11.

Figure 2:
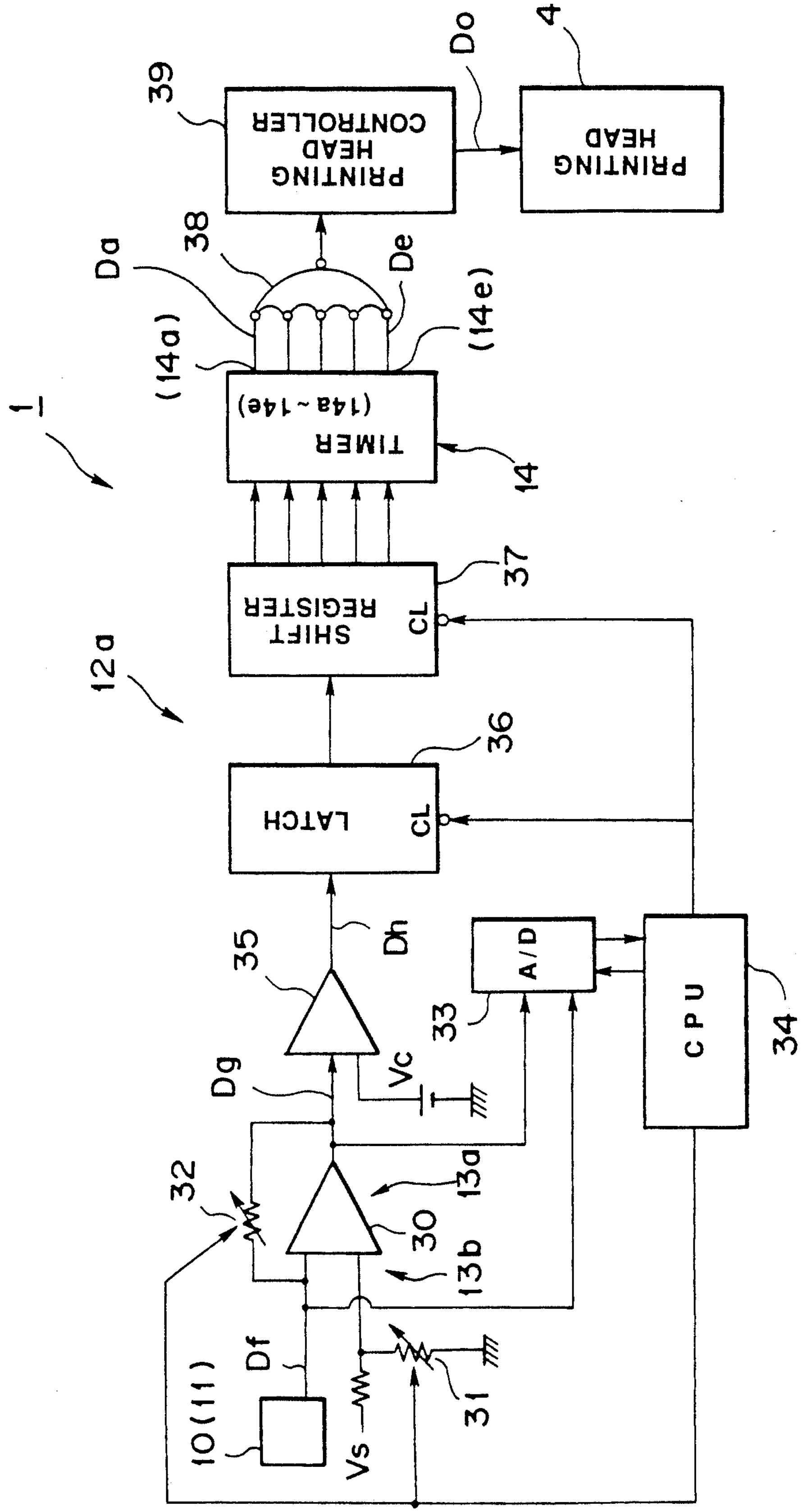
FIG. 2 is a block diagram showing an example of a detection circuit of a label paper in the controller of the label printer of FIG. 1.

Such label papers S affixed on the continuous printing paper P can be detected by a label position detector 12*a* shown in FIG. 2.

In FIG. 2, an operational amplifier 30 is composed of an amplifier 13*a* and a comparator 13*b* and compares a reference signal (voltage) Vs with a detection signal Df of the position sensor 10 to amplify a difference therebetween (the circuit at the side of the position sensor 11 is identical). Further, connected to the operational amplifier 30 are a variable resistor 31 for varying the magnitude of the reference signal Vs and a variable resistor 32 for varying the gain of the operational amplifier.

An A-D converter 33 converts the detection signal Df of the position sensor 11 and an output signal Dg of the operational amplifier 30 into digital signals to supply them to a CPU 34. The CPU 34 can set values of the resistors 31 and 32 to any values variably and compare an output for the continuous paper R and an output for the label paper S from the position sensor 10 in the setting or modification of the resistance values of the resistors 31 and 32 so that it is determined whether the continuous paper R and the label paper S can be distinguished clearly from each other by the output of the operational amplifier 30. At this time, when a relative detection signal for the label paper S is small, the CPU 34 changes the values of the resistors 31 and 32 to increase the relative detection signal for the label paper S. When the continuous paper R and the label paper S can be distinguished clearly from each other by the output of the operational amplifier 30, the values of the resistors 31 and 32 are fixed. Further, a comparator 35 compares the output signal of the operational amplifier 30 with a reference voltage Vc to produce an output corresponding to the label paper S. A latch circuit 36, a shift resistor 37, and 14 a timer portion 14 are provided. The timer portion 14 includes five independent timers 14*a* to 14*e*. The position sensor 10 is positioned at the side of the supply reel as compared with an actual transfer point 6*p* for printing data (position of the transfer charger 6). Accordingly, subsequent label papers S pass through the position sensor 10 successively until the first label paper S (Sa) reaches to the transfer point 6*p* after the first label paper S has been detected by the position sensor 10. Correspondingly, a plurality of timers, that is, the five independent timers 14*a* to 14*e* in the embodiment, each time the label papers S which are detected by the position sensor 10. The timers 14*a* to 14*e* are started successively and the printing head 4 is started successively in response to the count outputs of the started timers 14*a* to 14*e*. In FIG. 2, a logic gate 38 and a controller 39 are provided for the printing head 4 which produces a timing control signal Do in response to each of the count outputs from the timers 14*a* to 14*e* to start the printing head 4. Since a multiplicity of label papers S are affixed on the paper R constituting the printing paper P at regular intervals, the label position detector 12*a* produces output signals during printing on the moving printing paper P, that is, the controller 39 produces intermittent timing control signals Do in accordance with each of the label paper S.

On the other hand, the position sensor 10 (11) is disposed opposite to the traveling path N of the continuous printing paper in the machine body 80 as shown in FIG. 1, while the positions of the position sensors are set as follows. When the peripheral length on the outer periphery of the photosensitive drum 2 from the position 4*p* opposite to the printing head 4 to the transfer point 6*p* opposite to the transfer charger 6 is L1, a distance L1 equal to the peripheral length L1 is taken on the traveling path from the transfer point 6*p* opposite to the transfer charger 6 toward the supply reel and the position at the distance L3 obtained by adding a small distance L2 to the distance L1 is set as a disposition position Mp. The position sensor 10 is disposed at this point Mp. Accordingly, the position at the distance L1 on the traveling point N starting from the transfer point 6*p* is set as a starting point Gp for the printing head 4. Thus, when the leading edge of the label paper S reaches the point Gp, the printing head 4 is started so that printing information is transferred onto the label paper S when the label paper S detected by the position sensor 10 reaches the position 6*p* of the transfer charger 6.

In the present invention, the time until the label paper S on the moving printing paper P reaches the starting point Gp after the label paper S has been detected by the position sensor 10 at the disposition point Mp is measured by each of the timers 14*a* to 14*e* of the timer portion 14. More particularly, since the moving speed of the printing paper P is previously set, the time Tp required to cause the label paper S to move from the disposition point Mp of the position sensor 10 to the starting 10. Gp of the printing head 4 is determined by dividing the distance L2 from the disposition point Mp of the position sensor 10 to the starting point Gp by the moving speed of the printing paper P. Accordingly, the required time Tp is previously set as the count time for the timers 14a to 14e so that timing control signals can be supplied to the printing head 4 for each of the label papers S even when a multiplicity of label papers S on the moving printing paper P successively pass through the position sensor 10

Figure 3:
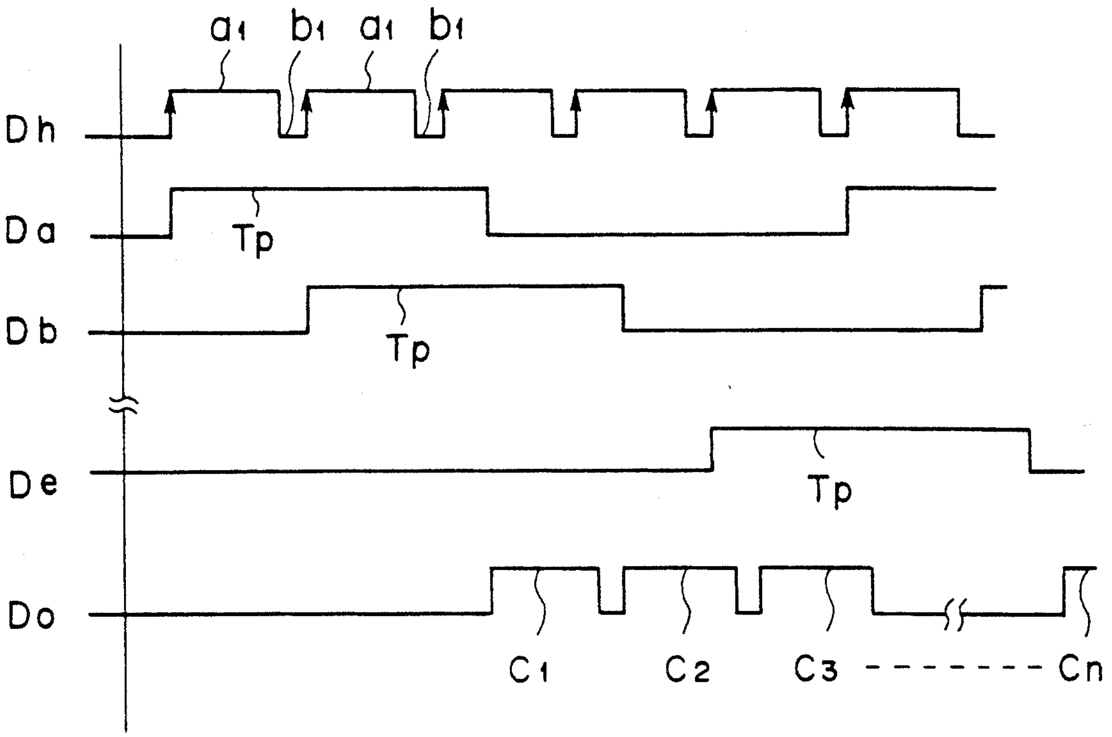
FIG. 3 is a time chart showing an operation start timing by the controller of the label printer.

FIG. 3 is a timing chart showing an output waveform (Dh) of the comparator 35 for the position sensor 10, an output waveforms (Da-De) of the timers 14a to 14e, and an output waveform (Do) of the controller 39 for the printing head 4. The output of the comparator 35 of the position sensor 10 includes a waveform $b_1$ for a portion of the continuous paper R constituting the printing paper P on which the label paper S is not affixed and a waveform $a_1$ for a portion in which the label paper S is affixed on the printing paper P. The timers 14a to 14e are started in response to the output of the comparator 35 indicative of the portion in which the label paper S is affixed on the printing paper P and counts the time Tp. Each time the counts for the time Tp by the timers 14a to 14e have been completed, the controller 39 of the printing head 4 produces print commands $c_1$ to $c_n$, respectively. Further, the five timers 14a to 14e are reset each time the counts have been completed. In the embodiment, five timers 14a to 14e are provided. However, while any number of the timers may be provided.

With the above configuration, each of the label paper S on the printing position of the continuous printing paper P is detected successively in the traveling path N and the photosensitive drum 2 is charged to be given the printing information while the label paper S reaches the transfer point 6p of the transfer charger 6. The toner attached on the information portion can be transferred to a predetermined position of each of the label papers S by means of the transfer charger 6 without the need for useless paper.

In the embodiment, the detection signal of the leading edge of the label paper S by the position sensor 10 is utilized as the timing control signal for starting the operation of the printing head 4 in the printing mechanism U1 disposed around the photosensitive drum 2. Accordingly, the start of the printing head 4 is made in response to the leading edge of the label paper S, although the set time of the timer 14 can be adjusted so that the start of the printing head 4 can be made in response to any position in the feeding direction of the label paper S. Further, in the present invention, the detection signal by the position sensor 10 may be used as the timing signal for starting the operation of the suction device 91 and the fixing device 7.

Further, in the case where a multiplicity of label papers S each having a predetermined length are affixed on the continuous printing paper P at regular intervals, since the position sensor 10 produces repeatedly the same detection signals for the first label paper S and the continuous paper R, the operation timing of the printing head 4 for each of the label papers S may be controlled in accordance with the detection signal for the first label paper S and the continuous paper R.

To detect each of the label paper S on the continuous printing paper P and control the operation timing of the printer on the basis of the detection signal is required in the case where each of the label papers S on which the printing has been completed is cut by the cutter mechanism U2.

Figure 5:
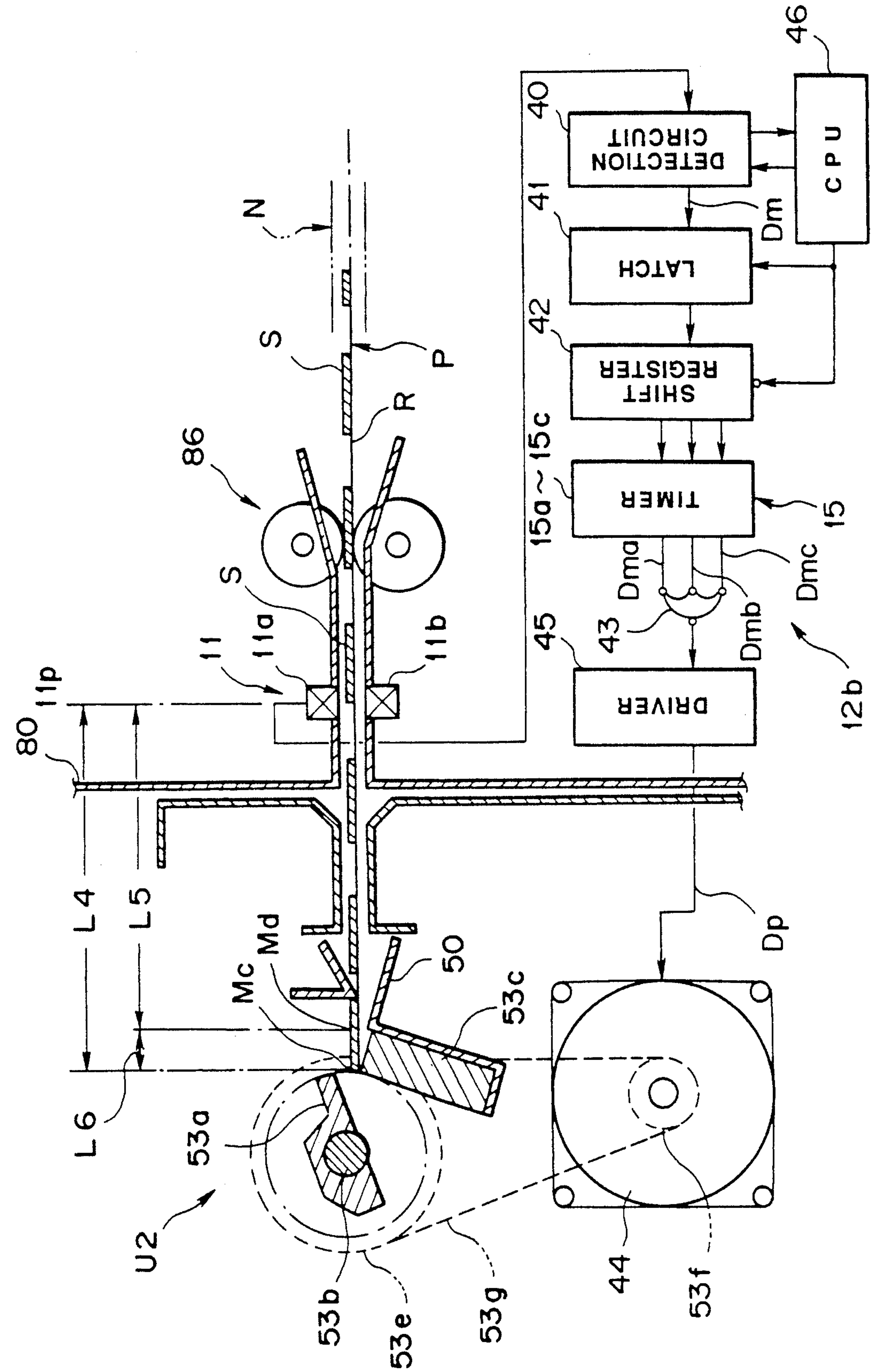
FIG. 5 is a sectional view of a main portion of a cutter mechanism in the controller of the label printer.

In the present invention, in order to control the timing for cutting the moving printing paper P on which the printed label papers S are affixed by the cutter mechanism U2 for each label paper S, the following configuration is adopted. As shown in FIGS. 1 and 5, a position sensor 11 is provided which includes a light receiving portion 11a disposed above the printing paper P immediately after the final stage of roller mechanism 86 in the traveling path N of the machine body 80 and a light emitting portion 11a disposed opposite to the light receiving portion 11a to hold the printing paper P between the light receiving portion 11a and the light emitting portion 11b. This position sensor 11 is the same configuration as that of the above-mentioned position sensor 10.

The detection signal of the position sensor 11 is processed by a label position detector 12b configured in the same manner as the label position detector 12a. FIG. 5 shows the label position detector 12b in the position sensor 11. In FIG. 5, a detection circuit 40 is provided for processing the detection signal of the position sensor 11 and which includes a circuit provided before the comparator 35 in the circuit shown in FIG. 2. A latch circuit 41 is provided for latching an output of the detection circuit 40. A shift register 42 is provided for successively starting three timers 15a to 15c of the timer portion 15 in response to each of the detection signals for the label papers S applied through the latch circuit 41. An OR gate 43 is provided for supplying a control signal to a driver 45 which drives a pulse motor 44 each time the timers 15a to 15c have completed the count of time Tm. A CPU 46 controls each of portions of the detection circuit 40. Thus, the timing control signal Dp can be obtained in the output of the label position detector 12b, that is, the output of the driver 45 in the position sensor 11 in the same manner as the position sensor 10.

On the other hand, the cutter mechanism U2 is detachably disposed at the delivery side of the printing paper P in the machine body 80.

As shown in FIG. 5, the cutter mechanism U2 includes an introduction portion 50 for the printing paper P formed of a plate and disposed on a plane extending from the traveling path N of the printing paper P in the machine body 80 and further includes a rotary cutting edge 53a and a receiving edge 53c disposed to hold the introduction path 50 therebetween so that a cut point Mc is formed on the extension line of the traveling path N.

The cutting edge 53a is mounted on an axis 53b and is coupled, for example, through pulleys 53e and 53f and a belt 53g to a stepping motor 44 so that the cutting edge 53a effects rotary cutting operation having peripheral rotational speed controlled to any value by means of an output of the motor 44.

The distance L4 between the disposition point 11p of the position sensor 11 and the cut point Mc can be replaced by an increment of time since the traveling speed of the printing paper P is previously known. Accordingly, the motor 44 is controlled so that the cutting edge 53a is rotated and reaches the cut point Mc after the time required to move the label paper S by the distance L4 after the position sensor 11 has detected the leading edge of the label paper S as a cut position.

In the embodiment, since the cutting edge 53*a* is rotary, the time required for one rotation of the cutting edge 53*a* starting from the cut point Mc to reach the cut point Mc again is controlled in accordance with the rotational speed of the motor 44. Accordingly, the distance L5 from the disposition point 11*p* to the starting point Md of the motor 44 is replaced by the time Tm and the time Tm is counted by the timers 15*a* to 15*e* of the timer portion 15 for each of the label papers S.

Accordingly, the time Tc required for a half rotation of the cutting edge is matched to the distance L6 from the start point Md of the motor until the cut position of the label paper S reaches the cut point Mc by the rotation of the motor 44.

Figure 4:
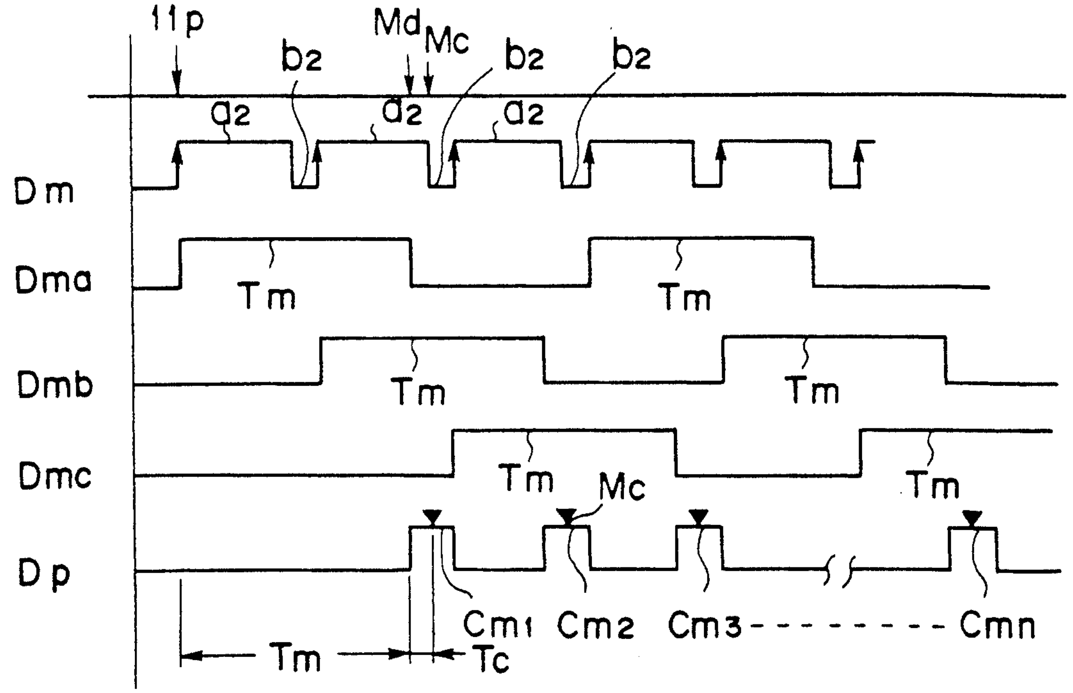
FIG. 4 is a time chart showing a cut timing by the controller of the label printer.

The detection signal for the label paper S and the continuous paper R by the light receiving portion 11*a* in the position sensor 11, the count times Tm of the timers 15*a* to 15*e* and a control output for the rotation of the motor 44 for driving the cutting edge 53*a* to effect the cutting operation are related as shown by the timing chart of FIG. 4.

In the timing chart of FIG. 4, the output of the position sensor 11 is supplied through a comparator (not shown and corresponding to the comparator 35 of FIG. 2) in the detection circuit 40 and the output of the detection circuit 40 includes an output $a_2$ for the label paper S on the printing paper P and an output $b_2$ for the continuous paper R without the label paper S.

The timers 15*a* to 15*c* are started successively in response to the output indicative of the label paper S and successively count the time Tm which is previously set for each of the timers. In FIG. 4, Dma–Dmc are output waveforms of the timers 15*a* to 15*c*.

Each time each of the timers 15*a* to 15*c* have completed the counting of the time Tm, control commands $cm_1$ to $cm_n$ are successively supplied to the drive motor 44 of the cutting edge 53*a*. This series of operations is repeated for the plurality of label papers S on the printing paper P.

In the control system, the timer portion 15 includes three timers 15*a* to 15*c*. The reason is that it is assumed that at most three label papers S on the printing paper P exist between the cut position detection point, that is, the disposition point 11*p* of the position sensor 11 and the cut point Mc. Accordingly, the number of the independent timers of the timer portion 15 can be set to any number depending on the number of the label papers S existing between the points 11*p* and Mc.

In the embodiment, the cut position is set to the leading edge of the label paper S, although the time Tc, that is, the distance L6 can be set to any value to set the cut position before the leading edge of the label paper S, for example, to an intermediate portion between the adjacent label papers S on the printing paper or to cut any position of the label paper S.

Further, in the case where the label paper S having the same width are affixed on the printing paper P at regular intervals starting from the first label paper S, the cutting edge 53*a* may be controlled at the peripheral speed so that the label papers S are cut on the basis of the detection signals for the first label paper S and the continuous paper R. In the present invention, it is a matter of course that a continuous paper on which label papers are formed with perforations can be utilized.

Further, in order to permit more exact printing, the following skew correction mechanism U3 is provided. The skew correction mechanism U3 is disposed in the traveling path N of the printing paper P to control (correct) continuously the position in the width direction of the printing paper P to a normal position with respect to the peripheral surface of the photosensitive drum 2.

Figure 6:
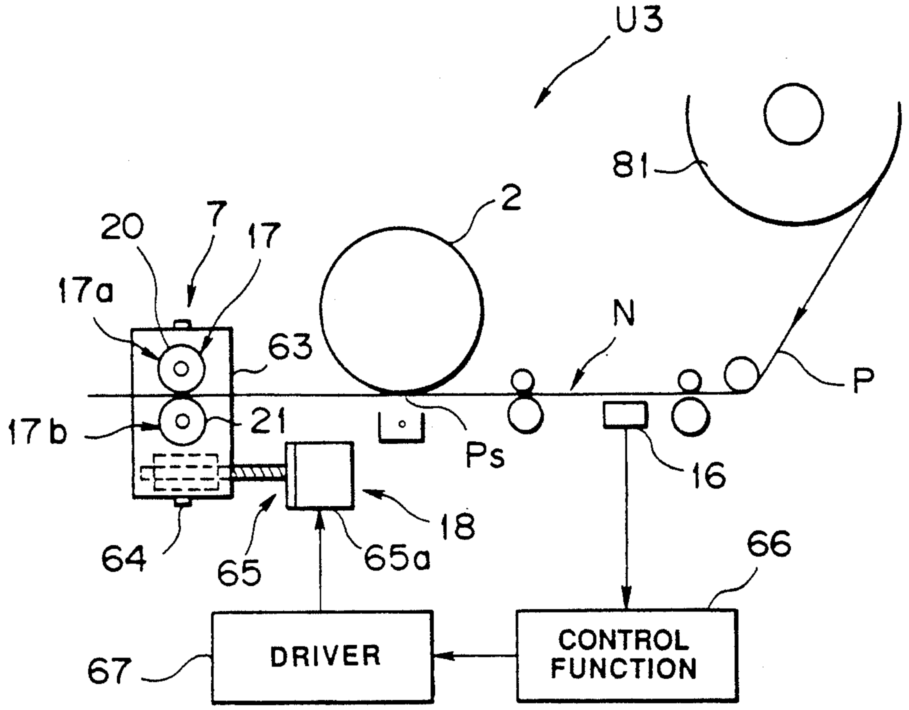
FIG. 6 is is a system block diagram of a skew correction mechanism.
Figure 7:
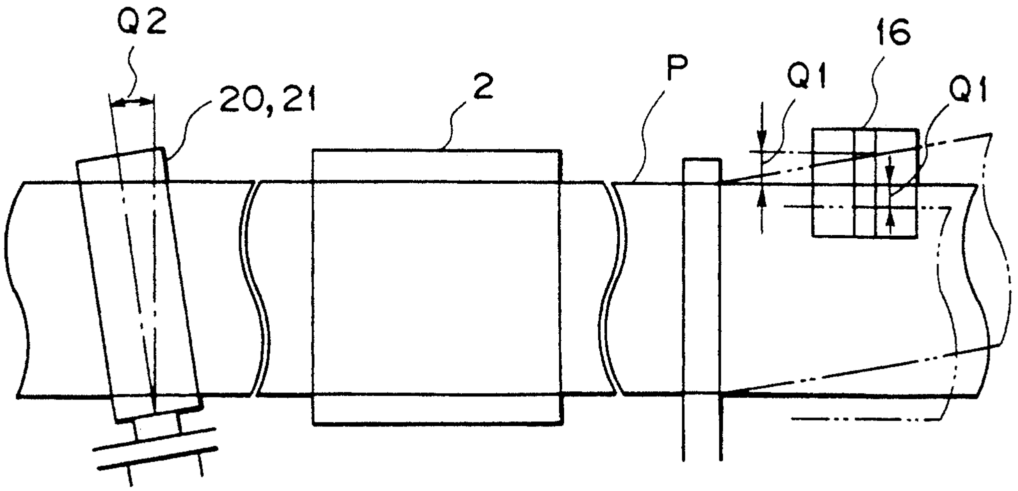
FIG. 7 is a front view schematically illustrating a relation of a paper width sensor of the skew correction mechanism and a roller mechanism.

The configuration of the skew correction mechanism U3 is now described with reference to FIG. 6. A paper width sensor 16 mounted by utilizing guide plate 87 is disposed in the traveling path N of the printing paper P near the supply reel between the photosensitive drum 2 and the supply reel. The paper width sensor 16 is to detect the position of the printing paper P in the width direction thereof and can utilize an image sensor employing a lens array, for example. The paper width sensor 16 is disposed in the vicinity of the edge portion of the printing paper P.

Figure 9:
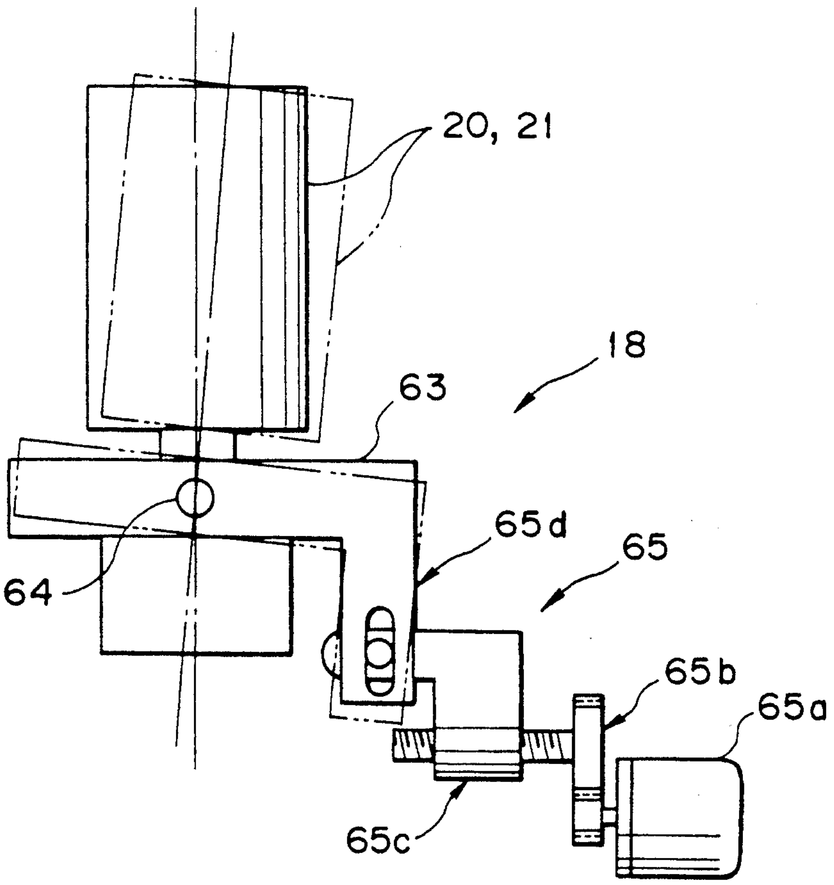
FIG. 9 is a diagram showing a configuration of a roller inclination actuator of the skew correction mechanism.

On the other hand, the fixing device 7 is provided with a roller inclination actuator 18. The actuator 18 supports a base 63 including a heat roller 20 (drive roller 17*a*) and a heat roller 21 (driven roller 17*b*) by a horizontal axis 64 perpendicular to the moving direction of the printing paper P rotatably and is structured to be inclinable in the forward and backward direction by a drive portion 65. The drive portion 65 includes a stepping motor 65*a*, a reduction mechanism 65*b*, a ball and screw mechanism (rotation-straight motion conversion mechanism) 65*c*, and a link mechanism (moving direction conversion mechanism) 65*d*, for example as shown in FIG. 9, and can rotate the stepping motor 65*a* to incline the heat rollers 20 and 21 in the forward and backward direction.

Further, there is provided a control function portion 66, which obtains a positional deviation Q1 in the width direction of the printing paper P on the basis of the detected result of the paper width sensor 16 to calculate an angle correction value Q2 for the heat rollers 20 and 21 on the basis of the positional deviation Q1 and drives the actuator 18. A control signal produced from the control function portion 66 is supplied to the stepping motor 65*a* through a driver 67.

Figure 8:
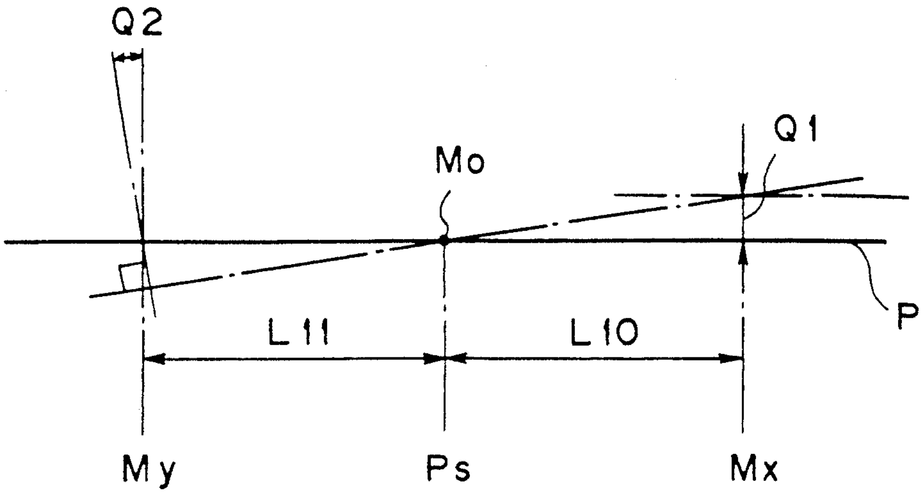
FIG. 8 illustrates a principle of the skew correction mechanism.

The principle of the skew correction is now described. As shown in FIG. 8, when the normal position at the contact position Ps of the printing paper P into contact with the photosensitive drum 2 is Mo, the distance from the contact position Ps to the position Mx which is a detection position of the paper width sensor 16 is L10, and the distance from the contact position Ps to the position My in which the printing paper P is in contact with the heat rollers 20 and 21 is L11, all of these are already known and accordingly the positional deviation Q1 with respect to the normal position (position Mo) of the position Mx can be detected by the paper width sensor 16 so that the inclination angle of the heat rollers 20 and 21 (angle of the roller axis with respect to the normal line), that is, an optimum angle correction value Q2 can be calculated. In this calculation method, a data table of the angle of correction values Q2 with respect to the positional deviations Q1 is stored in the control function portion 66 and the angle correction value can be easily obtained from the table. Further, the contact position Ps represents the position for transmitting and receiving the information and whether mechanical contact is made or not is not quite important.

Accordingly, the positional deviation of a predetermined position with respect to the position to be corrected is detected indirectly by the paper width sensor 16 so that the skew in the desired position can be corrected. Further, the heat rollers 20 and 21 of the fixing device 7 may be replaced by another roller mechanism 86.

On the other hand, the roller mechanism 86 is utilized to provide a paper jam detection mechanism U4.

The roller mechanism 86 includes a drive roller 86a (17a) disposed in the traveling path N under the printing paper P and a driven roller 86b (17b) disposed above the printing paper P in opposed relationship to the drive roller 86a which is structured to be rotated in the normal direction and reverse direction by a motor 71 through an electromagnetic clutch 86c and then stopped. The rotation of the drive roller 86a of the roller mechanism 86 in the normal direction and reverse direction moves the printing paper P in the direction shown by solid arrow or broken arrow in FIG. 10.

Thus, since a mounting axis 72 of the driven roller 86b is supported by a bearing when the driven roller 86b is free or integral to the mounting axis 72, the driven roller 86b is rotated to follow the printing paper P only when the printing paper P is moved by the rotation of the drive roller 86a. Accordingly, when the printing paper P can not be moved due to paper jam even if the drive roller 86a is rotated, the driven roller 86b is not rotated. Thus, the rotational state of the driven roller 86b is watched while the printing paper P is moved and the occurrence of a paper jam can be detected.

Thus, an opening (or slit) 73 is formed on the periphery of the driven roller 86b. A rotation sensor 22 is provided which includes a light emitting portion 22a and a light receiving portion 22b disposed to hold the opening 73 therebetween. When a rotation detection output signal produced from the rotation sensor 22 is missing, a detection portion judges the occurrence of paper jam and detects the paper jam. It is desirable that such mechanism is provided for each roller mechanism 86.

Figure 11:
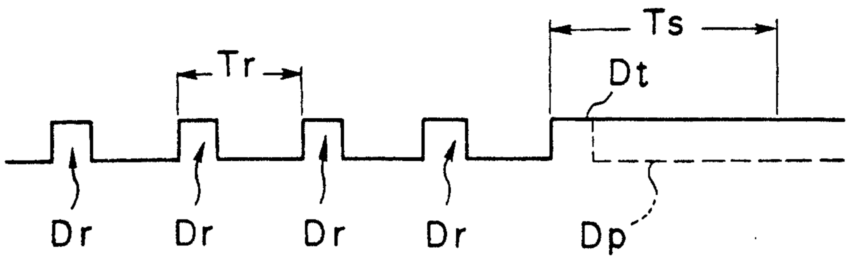
FIG. 11 is a time chart showing an output waveform of a rotation sensor in the paper jam detection mechanism.

FIG. 11 shows an example of a rotation detection signal pattern produced from the rotation sensor 22. When the printing paper P is moved at a constant speed, the light receiving portion 22b of the rotation sensor 22 receives light from the light emitting portion 22a and produces light receiving signal Dr at a constant period Tr. However, when the rotation of the driven roller 86b is stopped, the light receiving signal Dr is not produced at the constant period Tr and the output of the light receiving portion 22b remains an output level (Dt shown by a solid line) in the light receiving state or an output level (Dp shown by a broken line) in the state in which light is not received. Accordingly, the paper jam is judged when the output having the above waveform is produced.

In the present invention, when the output Dr having the above waveform is continued during the time Ts which is previously set to the timer Ti, the paper jam detection signal Dj is formed.

Figure 10:
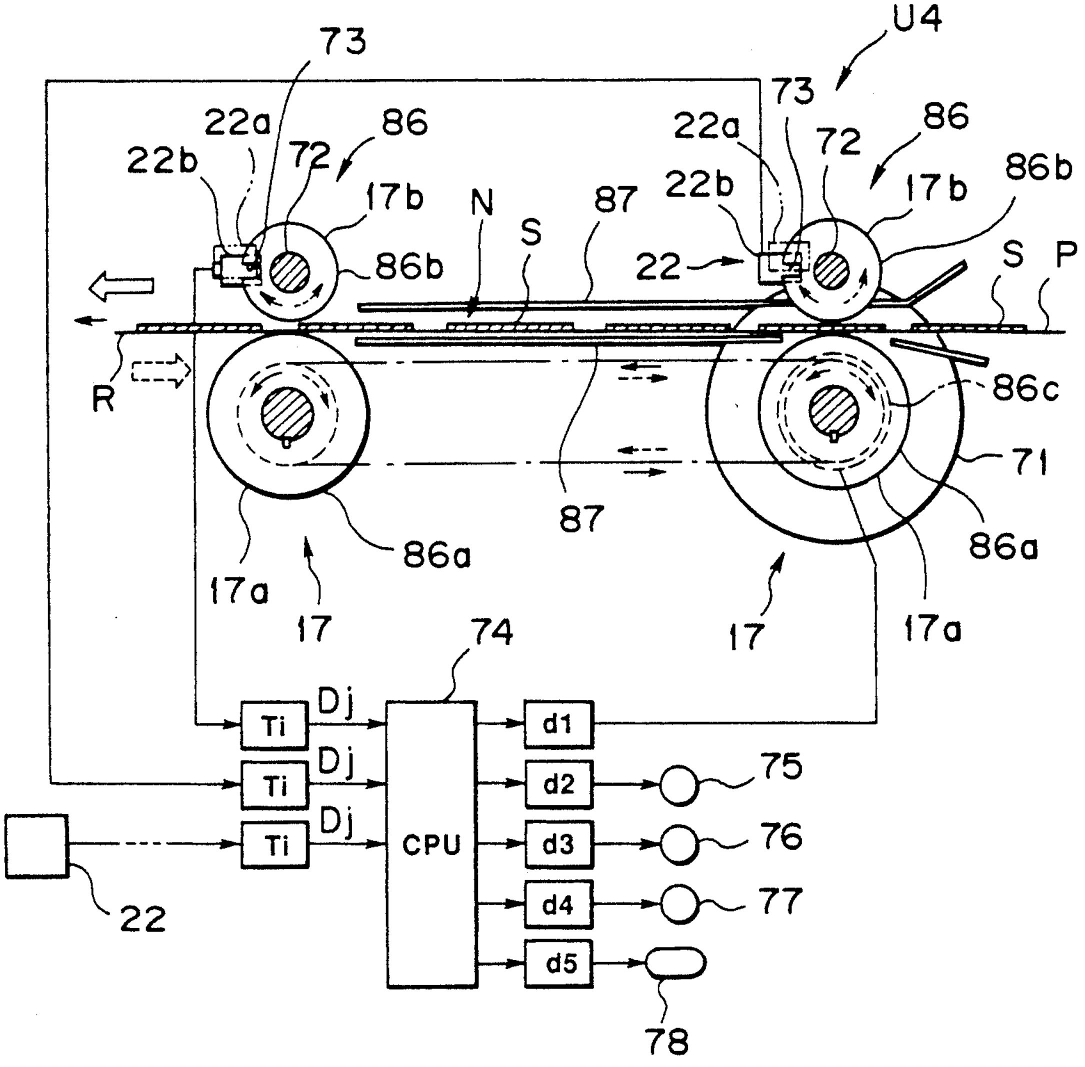
FIG. 10 is a block diagram showing a paper jam detection mechanism.

The paper jam detection signal Dj thus detected is supplied to a controller having a CPU 74 as shown in FIG. 10. The CPU 74 supplies control outputs to drivers $d_1$–$d_5$ for a clutch 86c for releasing the connection between the drive roller 86a and the motor 71, motor 75 for separating the transfer charger 6 from the photosensitive drum 2, motor 76 for separating the heat roller 21 in the fixing device 7 from the printing paper P, drive motor 77 of the supply reel 81 and a paper jam indicator 78. More particularly, the paper jam signal Dj is supplied to cut the clutch 86c so that a rotational force is not transmitted from the motor 71 to the drive roller 86a and the movement of the printing paper P is stopped. At the same time, the separation motor 75 of the transfer charger 6 is operated to rotate the charger 6 counterclockwise slightly and the separation motor 76 of the heat roller 21 in the fixing device 7 is operated to move the heat roller 21 downward and release the contact between the printing paper P and the heat rollers 20 and 21. Then, the motor 77 of the supply reel 81 is stopped and the indicator 78 indicates the paper jam.

Accordingly, the paper jam can be detected exactly and rapidly with a simple structure and useless burden on the machine side can be avoided. The paper jam can be removed easily and rapidly and it is prevented that the printing paper in the state of paper jam is fed vainly.

We claim:

1. A controller of a label printer including a main charger for charging a photosensitive drum, a printing head for applying printing information, a developer for attaching toner, a transfer charger for transferring the toner on the photosensitive drum to label papers affixed on a continuous paper constituting a continuous printing paper and a fixing device for fixing the toner by causing the continuous printing paper to pass through the fixing device, and capable of successively printing on the label paper, comprising a position sensor using a photoelectric transducer element which is disposed in juxtaposition with the continuous printing paper and for detecting a difference in the transmissivity of light of the continuous printing paper and a label position detector for processing a detection signal of said position sensor to derive a timing control signal corresponding to a position of the label paper.

2. A controller of a label printer according to claim 1, wherein said label position detector includes an amplifier for amplifying the detection signal of said position sensor and a comparator for comparing the detection signal with a reference signal.

3. A controller of a label printer according to claim 2, comprising a variable setting function for automatically setting a gain of said amplifier and a magnitude of said reference signal so that a relative detection output of the label paper is increased with respect to the detection signal.

4. A controller of a label printer according to claim 1, comprising control means for controlling an operation start timing of a printing head of a printing mechanism and the transfer charger in accordance with the timing control signal of said label position detector.

5. A controller of a label printer according to claim 4, wherein said position sensor is disposed at a position in a traveling path of the continuous printing paper corresponding to a position of the printing head or at the side of a supply reel of the continuous printing paper.

6. A controller of a label printer according to claim 4, wherein said control means includes a timer for setting a printing position for the label paper after detection of the label paper by said position sensor.

7. A controller of a label printer according to claim 6, wherein a plurality of said timers are provided in accordance with each of the label papers and the number of the plurality of timers is selected so that, until printing for the label paper is completed after the label paper has been detected, the printing positions for other label papers can be set.

8. A controller of a label printer according to claim 1, comprising control means for controlling a cut timing of a cut mechanism in response to the timing control signal of said label position detector.

9. A controller of a label printer according to claim 8, wherein said position sensor is disposed behind the fixing device.

10. A controller of a label printer according to claim 8, wherein said control means includes a timer for setting a cut position for the label paper after detection of the label paper after printing by said position sensor.

11. A controller of a label printer according to claim 10, wherein a plurality of said timers are provided in accordance with each of the label papers and the number of the plurality of timers is selected so that, until printing for the label paper is completed after the label paper has been detected, the cutting positions for other label papers can be set.

12. A controller of a label printer according to claim 1, comprising a paper width sensor for detecting a position of the continuous printing paper in the width direction thereof, a roller inclination actuator capable of inclining a roller mechanism including a drive roller for feeding the continuous printing paper and a driven roller in forward and backward direction with respect to the traveling direction of the continuous printing paper, and a skew correction mechanism for driving said actuator to variably control an inclination angle of the roller mechanism in the direction of decreasing positional deviation of the continuous printing paper on the basis of the positional deviation with regard to a normal position obtained by detection of said paper width sensor.

13. A controller of a label printer according to claim 12, wherein said roller mechanism employs a pair of heat rollers in the fixing device.

14. A controller of a label printer according to claim 12, comprising a rotation sensor for detecting rotation of a driven roller and a paper jam detection mechanism for detecting a paper jam in accordance with a detection result of said rotation sensor.

15. A controller of a label printer according to claim 14, wherein a duration of an output produced from said rotation sensor when said rotation sensor detects a stop of the driven roller is counted and the paper jam is detected when the count exceeds a predetermined time.

* * * * *